May 19, 1936.　　　　　　B. JOHNSON　　　　　　2,041,249
FOLDING FISHING LINE DRIER
Filed May 7, 1935　　　　2 Sheets-Sheet 1
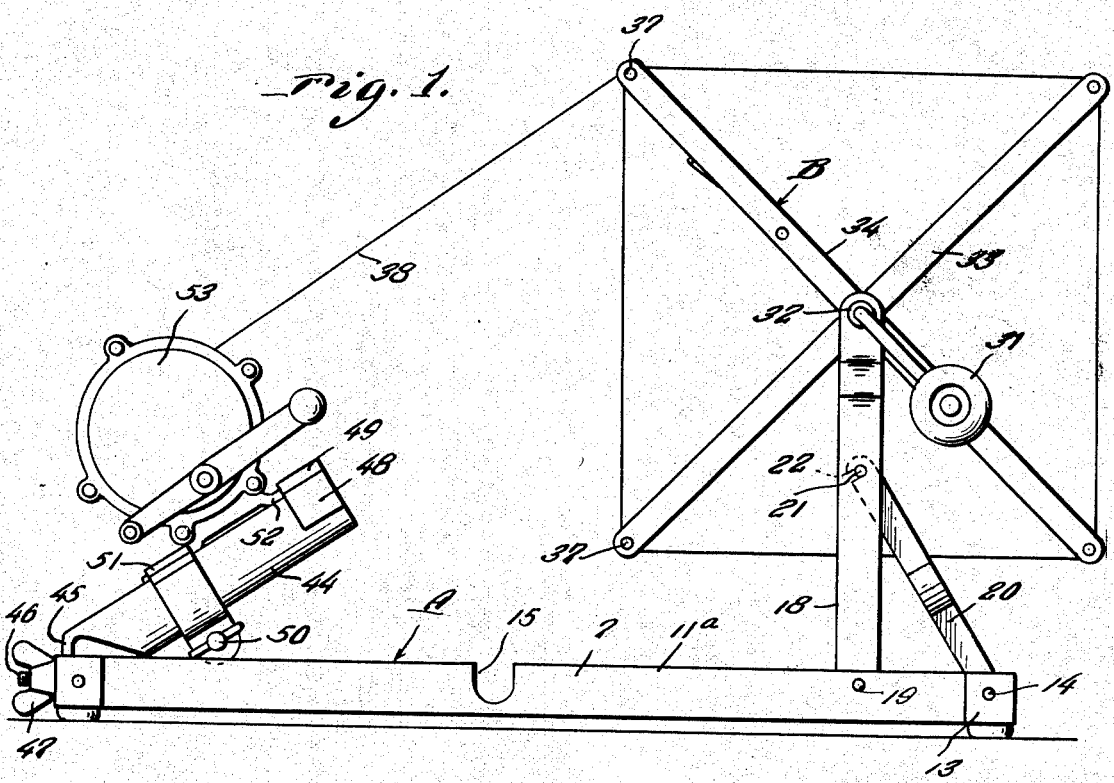
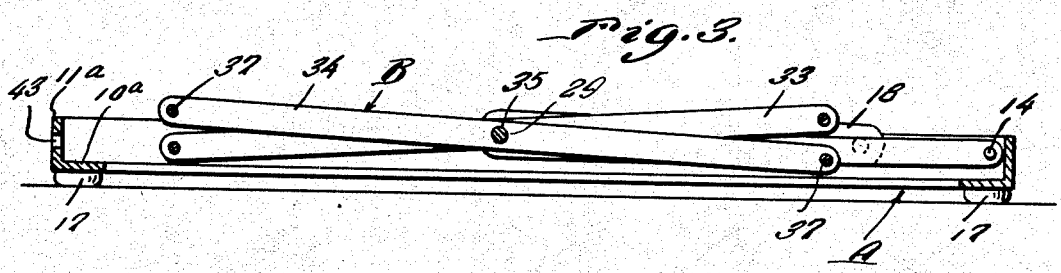
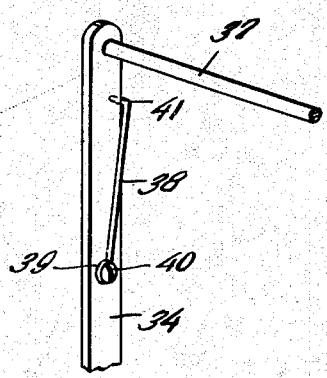
Inventor
Benjamin Johnson
By Clarence A. O'Brien
Attorney

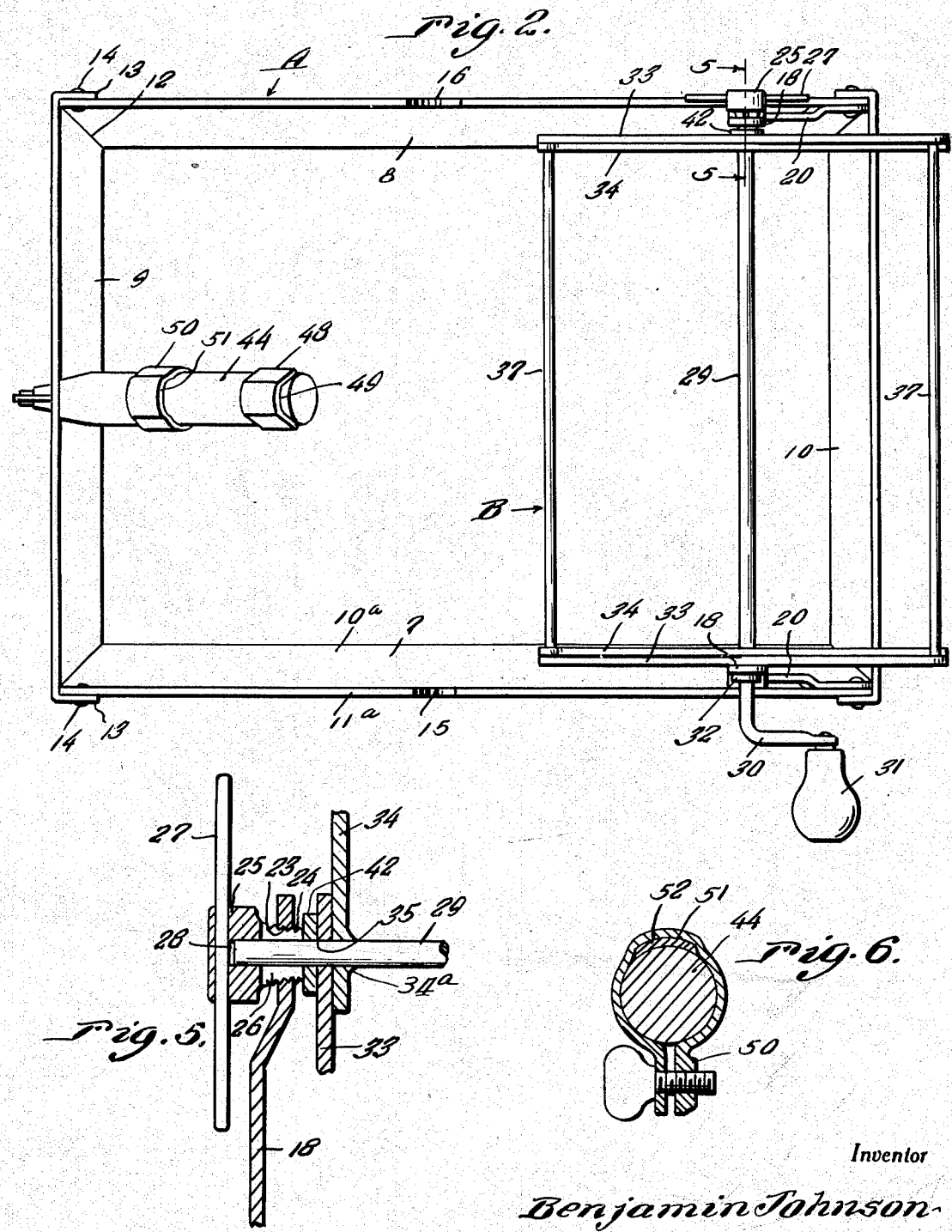

Patented May 19, 1936

2,041,249

UNITED STATES PATENT OFFICE 2,041,249

FOLDING FISHING LINE DRIER

Benjamin Johnson, New Suffolk, N. Y.

Application May 7, 1935, Serial No. 20,247

1 Claim. (Cl. 242—104)

This invention relates to a folding fishing line drier.

The object of the invention is to provide a balanced base for a collapsible fishing line drying reel so as to accommodate the folding of the reel into a compact arrangement occupying very little storage room.

Another feature of the invention is the construction of one of the journals for the reel shaft that applies and releases the tension to the parts of the drying reel to admit the reel to be collapsed.

Further objects of the invention are to provide a device of the character referred to that is strong, compact and durable, highly efficient in operation, that requires very little time and effort to assemble and disassemble and that is comparatively inexpensive to manufacture.

With the foregoing and other objects in view the invention consists of a novel construction, combination and arrangement of parts as will be hereinafter more specifically described and illustrated in the accompanying drawings wherein is disclosed a preferred embodiment of the invention, but it is to be understood that changes, variations and modifications may be resorted to without departing from the spirit of the claim hereunto appended.

In the drawings wherein like reference characters denote corresponding parts throughout the several views:

Figure 1 is a side elevation of the device in accordance with the present invention shown in the operative position.

Figure 2 is a top plan view thereof with the fishing line reel removed from the support.

Figure 3 is a detailed longitudinal section through the device in folded relation with the fishing line reel support removed.

Figure 4 is a fragmentary portion of the drying reel in perspective.

Figure 5 is a detailed fragmentary vertical section taken substantially on line 5—5 and looking in the direction of the arrows.

Figure 6 is a transverse section through the fishing line reel support taken through the movable clamp thereof.

Referring to the drawings in detail, A indicates an open metal base substantially rectangular in configuration. The base includes angle iron side rails 7, 8 and angle iron end rails 9, 10. All the rails have one of their webs 10a disposed in a horizontal plane and all these webs lie in substantially the same plane. All of the rails have their outer webs 11a disposed in a vertical plane.

At the corners of the frame A the horizontal webs 10a are mitered as at 12 and to secure the rails of the frame together the vertical webs 11a of the end rails 9, 10 are formed on each end with right angled extensions 13. These extensions 13 overlap the ends of the vertical webs of the side rails 7, 8 and are secured thereto by means of the rivets 14. The vertical webs 11a of side rails 7, 8 are formed with substantially U-shaped notches 15, 16 and these notches open inwardly from the upper edges and serve to receive the end portions of the shaft 29 when the reel is collapsed. At the corners, the base A has four cushion knobs 17 secured to the lower faces of the horizontal webs 10a which serve as rests for the frame.

Adjacent one end of the frame are a pair of reel supporting arms 18, the lower ends of which swing on pivots 19 secured to the vertical webs 11a of the side rails 7, 8. These arms are substantially flat and fold inside the side rails 7, 8 when the device is folded for storage as will be seen in Figure 3 of the drawings. To lock the reel supporting arms 18 in vertical position, there are a pair of locking bars 20 pivoted at their lower ends on the rivets 14 in the corner of the frame. On intermediate portions of the reel supporting arms 18 are inwardly extending pins 21 which register with guide slots 22 in the free ends of the locking arms 20. Referring to Figure 5 of the drawings it will be seen that one of the reel supporting arms on the outer end is formed with an inwardly tapering threaded opening 23 which threadably receives the tapering threaded shank 24 on the bearing bushing 25. It will be seen that the tapering shank 24 is split radially as at 26. The bushing 25 on the outer protecting end has a handle 27 for turning the bushing. The bore 28 in the bushing 25 receives the one end of the drying reel shaft 29 and the other end of shaft 29 is formed with a crank 30 having the rotatable handle 31 on the end of the crank. Adjacent the crank 30, the shaft is journaled in the upper end of the other upright arm 18 through a bushing 32.

The line drying reel is indicated generally at B and on each side of the reel are a pair of crossed spokes 33, 34 the centers of which abut each other and are formed with registering openings 35 which receive the shaft 29. The spokes 34 are welded or pinched to the shaft as at 34a so as to act as abutments for the spokes 33. Rungs 37 are secured in the ends of the spokes connecting the pairs of spokes 33, 34 on one side of the reel with the pairs of spokes on the other side of the reel forming a bridge between the pairs of spokes on which is wound the fishing line 38. When the bushing 25 is released from its position clamping the adjacent spoke 33 against the complementary spoke 34, the spokes 33 will be free so that they can be rotated on the shaft 29 to assume a position extending in a general longitudinal direction with the spokes 34. Adjacent the end of one spoke 34 is secured a flexible prong 38 formed with an eye 39 bearing on the inner face of the spoke and secured thereto by a screw 40. The free end of the prong has a right angled extension 41 bearing on the edge of the spoke and under this extension is secured the free end of the fishing line to be wound on the drying reel.

It will be seen by referring to Figure 5 of the drawings that the registering openings 35 in the spokes 33 and 34 register with the bore 28 in the bearing bushing 25, on the one side of the reel. Embracing the shaft 29 and bearing on the outer spoke 33 of the reel at this point is a washer 42 against which bears the inner end of the split shank 24 on the bearing bushing. By turning the bearing bushing inwardly the shank of the bushing bears on the washer and locks the spokes of the reel together so that they will turn with the shaft, while the spokes may be collapsed to the position shown in Figure 3 of the drawings by loosening the bushing and folding the spokes in the relation indicated.

One end rail 9 of the frame A opposed to the end of the frame where the drying reel is mounted has an opening 43 in the vertical web and this opening is in the center of the end rail. A cylindrical fishing line reel support 44 inclines upwardly and inwardly from the end rail diagonally toward the axis of shaft 29 when the drying reel is in assembled operative position. One end of the support 44 has an angular flange 45 bolted to the end rail 9 by a bolt 46 extending through aperture 43 and the bolt is held in position by a wing nut 47 carried thereby. The free end of the cylindrical support 44 carries a strip 48 formed with a pocket 49 while on an intermediate portion is a movable clamp 50 formed with a pocket 51 registering with pocket 49. In these pockets 49 and 51 are detachably seated the tongues 52 on the fishing line reel 53. In the assembled relation the line 38 may be drawn from the fishing line reel 53 and wound on the rungs 37 of the drying reel.

When it is desired to collapse the device for carrying or storage posititon as shown in Figure 3 of the drawings, support bars 20 are moved to the right as shown in Figure 1 of the drawings thereby allowing reel supporting arms 18 to fold substantially into the plane of the base A. The spokes may be folded to the posititon shown in Figure 3 of the drawings by loosening the bushing nut 25.

Having thus described the invention, what is claimed as new is:

A reel of the character described comprising a base having upstanding side walls, a pair of uprights pivotally connected to the base, a shaft journalled through the said uprights and having actuating means at one end thereof, a pair of spoke forming cross members at each end of the shaft, one cross member at each end of the shaft being positively secured to the shaft, the other cross member being slidable and rotatable on the shaft, rungs between the ends of corresponding cross members, and means at the remaining end of the shaft whereby the adjacent slidable and rotatable cross member can be clamped against the adjacent fixed cross member, a pair of opposed side walls being provided with notches for receiving the end portions of the shaft.

BENJAMIN JOHNSON.